(No Model.)
J. VERDAM.
DEVICE FOR USE IN BOILING EGGS.
No. 440,980. Patented Nov. 18, 1890.
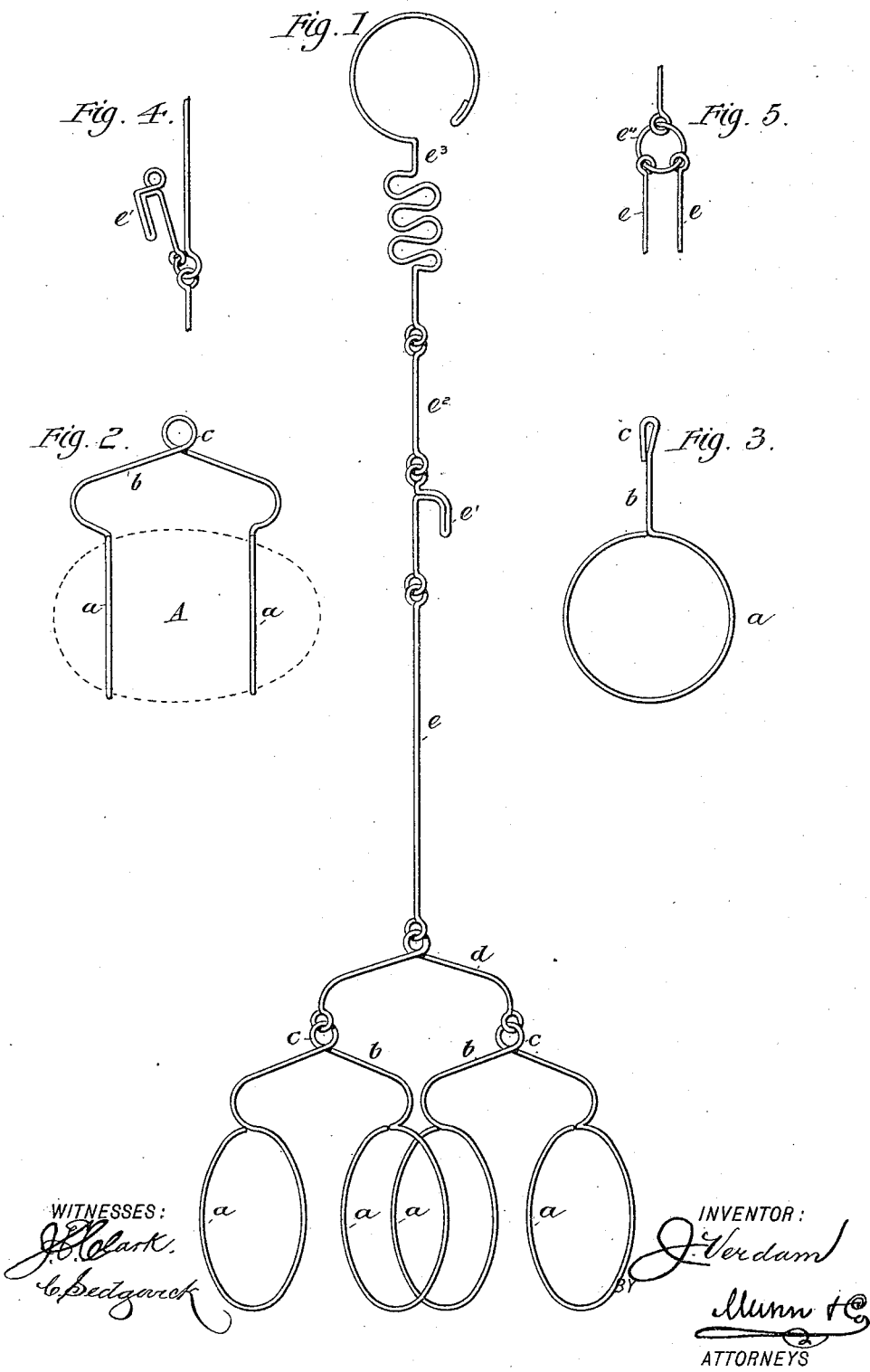

UNITED STATES PATENT OFFICE.

JACOB VERDAM, OF ALKMAAR, HOLLAND.

DEVICE FOR USE IN BOILING EGGS.

SPECIFICATION forming part of Letters Patent No. 440,980, dated November 18, 1890.

Application filed March 19, 1890. Serial No. 344,575. (No model.) Patented in Luxemburg November 25, 1889, No. 1,209; in Belgium December 16, 1889, No. 88,582; in France January 30, 1890, No. 202,084, and in England February 8, 1890, No. 20,096.

*To all whom it may concern:*

Be it known that I, JACOB VERDAM, a subject of the King of Holland, and a resident of Alkmaar, Holland, have invented a new and useful Improvement in Devices for Use in Boiling Eggs, (for which I have obtained Letters Patent in Luxemburg, No. 1,209, dated November 25, 1889; in Belgium, No. 88,582, dated December 16, 1889; in France, No. 202,084, dated January 30, 1890, and in Great Britain, No. 20,096, dated February 8, 1890,) of which the following is a specification.

The object of my invention is to provide a new and improved portable apparatus or arrangement and combination of appliances for holding or retaining eggs while being boiled in a kettle or other vessel containing water, and which will be more simple in construction and hold and boil eggs in a superior manner to the appliances heretofore in use for this purpose.

The invention consists in the arrangement of parts and details and combination of the same, as will be fully described hereinafter, and then pointed out in the claims.

Reference is to be had to the accompanying drawings, forming a part of this specification, in which similar letters of reference indicate corresponding parts in all the figures.

Figure 1 is an elevation of the new and improved apparatus completed as constructed to carry two eggs. Fig. 2 is a front elevation of the principal part $a\,a$, with the suspending-wire, and which holds or retains each egg A in a horizontal or nearly horizontal position while being boiled in a kettle or other vessel containing water, the egg A being indicated in dotted lines. Fig. 3 is an end elevation corresponding to Fig. 2. Fig. 4 is an elevation of a modified form of the hook part $e$ of the suspending-wire when made loose or free to hang onto the top rim or side of the kettle or other vessel with the egg part $a$ inside. Fig. 5 is an elevation showing how the several suspending wires or links are joined when the apparatus is constructed to retain and carry more than two eggs A.

The new or improved apparatus consists in constructing two circular and parallel bands, rings, or straps $a$ of elastic steel wire, or nickel, or electro-plated metal wire, or other equivalent material free at the end to expand, or fixed and let in, so as to hold each egg A, and bent at their upper part into a spring-loop $b$, with an eye $c$ at the center of each pair for hooking on to the one end of a corresponding link part $d$ at the lower end of a set of hanging wires or links $e$ to $e^3$. The spring-loop is elastic, so that the distance of the rings can be increased in bending it to put in or remove the egg, and the rings always take again their former position.

As shown in the arrangement illustrated in Fig. 1 several vertical hanging links $e$ to $e^3$ are used to carry the egg-holding straps or rings $a$, the link $e'$ being made of a double-bent or crook form, either as a fixed link, as in Fig. 1, or as a loose hanging link, as in Fig. 4, for hanging onto the edge, rim, or side of the kettle or other vessel in which the boiling water is placed to suspend and carry the link $e$ and the egg part $a$ within same, the upper part $e^3$ made in a curved or ring form at its top for lifting by the hand or fingers when placing it within or removing it from the kettle or other vessel. The upper link part $e^3$ is made of any shape for giving ornamentation.

Two of the circular parallel bands or rings $a$ are used to hold each egg A, and they can be constructed in one pair to carry and hold only one egg A, as in Fig. 2, or in two pairs to carry two eggs, as in Fig 1; or they may be made to carry more than two eggs A, in which case two lower hanging links $e$ would be used, connected to the part $e'$ by a ring or eye $e^4$, as shown in Fig. 5.

In this new and improved apparatus each egg A lies horizontally within the two spring-bands, (or fixed rings $a$, united by a spring-loop,) which grip the smaller ends of the egg and retain it steadily without the chance of displacement when suspended or placed beneath the surface of the water in the kettle or other apparatus to be boiled on a fire. As the opening in the top of kettles is generally narrow, one egg A and pair of rings $a$ might be inserted through it at a time and lowered into the water; also, the water would always remain absolutely pure.

Having thus fully described my invention,

I claim as new and desire to secure by Letters Patent—

1. A device for use in boiling eggs, consisting of a series of loosely-connected vertical links and a yoke loosely suspended by said links and having rings formed at its ends, lying in planes parallel with the plane of said links and aligning with each other horizontally, substantially as shown and described.

2. In a device for use in boiling eggs, the combination, with a frame comprising one or more pairs of horizontally-aligning rings and upwardly-converging arms integral with said rings, of bowed links connected to said arms and a series of vertical links connected to said bowed links, one of said vertical links having a suspension-hook and the upper vertical link having a lifting-ring, substantially as shown and described.

In testimony that I claim the foregoing as my invention I have signed my name, in presence of two witnesses, this 19th day of February, 1890.

JACOB VERDAM.

Witnesses:
HERMAN JAN VAN DOORN,
    Barthold Assueruszoon.
JAN CORTERVINK.